US011223381B2

(12) United States Patent
Edwards et al.

(10) Patent No.: US 11,223,381 B2
(45) Date of Patent: Jan. 11, 2022

(54) PHONE DOCKING STATION MOUNTED ON A VEHICLE FOR ENHANCED DRIVING SAFETY

(71) Applicant: SEEING MACHINES LIMITED, Fyshwick (AU)

(72) Inventors: Timothy James Henry Edwards, Braddon (AU); Ken Kroeger, O'Connor (AU)

(73) Assignee: SEEING MACHINES LIMITED, Fyshwick (AU)

( * ) Notice: Subject to any disclaimer, the term of this patent is extended or adjusted under 35 U.S.C. 154(b) by 0 days.

(21) Appl. No.: 15/550,917

(22) PCT Filed: Jan. 12, 2016

(86) PCT No.: PCT/AU2016/050011
§ 371 (c)(1),
(2) Date: Aug. 14, 2017

(87) PCT Pub. No.: WO2016/127204
PCT Pub. Date: Aug. 18, 2016

(65) Prior Publication Data
US 2018/0026669 A1    Jan. 25, 2018

(51) Int. Cl.
*H04B 1/00*     (2006.01)
*H04B 1/3877*   (2015.01)
(Continued)

(52) U.S. Cl.
CPC ............ *H04B 1/3877* (2013.01); *B60R 11/04* (2013.01); *G06K 9/00288* (2013.01);
(Continued)

(58) Field of Classification Search
CPC ............ H04B 1/3877; G06K 9/00288; G06K 9/00805; G06K 9/00845; G06K 9/2027;
(Continued)

(56) References Cited

U.S. PATENT DOCUMENTS 6,031,492 A * 2/2000 Griffin ................. H01Q 1/3275
343/702
7,482,937 B2 1/2009 Chai et al.
(Continued)

FOREIGN PATENT DOCUMENTS

EP             1610564         12/2005

*Primary Examiner* — Pakee Fang
(74) *Attorney, Agent, or Firm* — Jason P. Mueller; FisherBroyles, LLP

(57) ABSTRACT

Described herein is a mount (1) for supporting a mobile device (3) having a wireless transceiver (60) within a vehicle (5) having a driver. The mount (1) includes a body (7) having a supporting formation (9) adapted to releasably support the mobile device (3) in a supported operative position within the vehicle (5). The mount (1) also includes an electrical interface (25) for connecting to an external power source, the interface (25) being positioned to engage a complementary electrical port (27) of the mobile device (3) when the mobile device (3) is in the operative position to supply power to the mobile device (3). The mount (1) and the mobile device (3) collectively define an illumination device (29, 31) and a first camera (33) that cooperate to obtain predetermined performance information about the driver.

30 Claims, 5 Drawing Sheets

(51) Int. Cl.
    *H04M 1/04*       (2006.01)
    *B60R 11/04*     (2006.01)
    *H04M 1/64*       (2006.01)
    *H04M 1/72409*   (2021.01)
    *H04M 1/72463*   (2021.01)
    *H04M 1/02*       (2006.01)
    *G06K 9/00*       (2006.01)
    *G06K 9/20*       (2006.01)
    *G08B 21/06*     (2006.01)
    *H04M 1/60*       (2006.01)
    *H04N 5/77*       (2006.01)

(52) U.S. Cl.
    CPC ..... *G06K 9/00805* (2013.01); *G06K 9/00845* (2013.01); *G06K 9/2027* (2013.01); *G08B 21/06* (2013.01); *H04M 1/0264* (2013.01); *H04M 1/04* (2013.01); *H04M 1/6075* (2013.01); *H04M 1/64* (2013.01); *H04M 1/72409* (2021.01); *H04M 1/72463* (2021.01); *H04M 2250/10* (2013.01); *H04M 2250/52* (2013.01); *H04N 5/77* (2013.01)

(58) Field of Classification Search
    CPC .. G08B 21/06; H04M 1/0264; H04M 1/6075; H04M 1/72527; H04M 1/72577; H04M 2250/10; H04M 2250/52; H04N 5/77
    See application file for complete search history.

(56) References Cited

U.S. PATENT DOCUMENTS

| | | | |
|---|---|---|---|
| 9,966,985 B2* | 5/2018 | DiLaura | H04M 1/0264 |
| 2002/0013161 A1* | 1/2002 | Schaeffer | H04N 5/2256 |
| | | | 455/557 |
| 2007/0222617 A1* | 9/2007 | Chai | B60W 40/09 |
| | | | 340/573.1 |
| 2010/0157061 A1* | 6/2010 | Katsman | G07C 5/008 |
| | | | 348/149 |
| 2011/0137520 A1* | 6/2011 | Rector | H04M 1/72577 |
| | | | 701/36 |
| 2012/0018323 A1* | 1/2012 | Johnson | H04B 1/3888 |
| | | | 206/320 |
| 2013/0150122 A1* | 6/2013 | Kulas | H04M 1/0264 |
| | | | 455/556.1 |
| 2014/0226131 A1 | 8/2014 | Lopez et al. | |
| 2015/0242680 A1* | 8/2015 | Thukral | G06K 9/00335 |
| | | | 348/78 |
| 2017/0357359 A1* | 12/2017 | Mai-Krist | G06F 3/0416 |

* cited by examiner

PHONE DOCKING STATION MOUNTED ON A VEHICLE FOR ENHANCED DRIVING SAFETY

FIELD OF THE INVENTION

The present invention relates to a system of monitoring driver performance and in particular to a vehicle mounted electronics dock for a mobile phone that is designed to greatly enhance driving safety.

While some embodiments will be described herein with particular reference to that application, it will be appreciated that the invention is not limited to such a field of use, and is applicable in broader contexts.

BACKGROUND

Any discussion of the background art throughout the specification should in no way be considered as an admission that such art is widely known or forms part of common general knowledge in the field.

Automotive car manufacturers, companies that employ professional drivers, insurance companies and driver training bodies commonly utilise dedicated windscreen or dashboard mounted monitoring devices designed to improve safety through intelligent monitoring of the driving scene. These devices typically measure vehicle location, speed and acceleration forces, as well as sensing the forward road scene using a combination of video and RADAR technologies.

These monitoring devices are commonly able to detect and track certain features within the nearby vehicle environment such as other vehicles (including their position in the lane and relative velocity), traffic lights, speed signs, pedestrians and fixed obstacles. This information is analysed in order to alert the driver to potential future accidents and may issue warnings to the driver or provide information to other vehicle systems such as the vehicle brake controller, for example.

Some devices also optionally record video of the vehicle driver at the same time as the road scene, usually for insurance purposes, in order to understand what the driver was doing during a potential insurance event, such as an accident.

Additionally some luxury vehicles now demonstrate the means to analyse video of the driver's face and estimate the driver's direction and level of attention. Driver attention information is combined with the road scene and vehicle dynamics to create a complete sensory awareness of the scene to make the most intelligent warnings or control interventions.

There are generally three classes of monitoring devices available, (1) devices which are installed at the car or truck factory and are integrated into the vehicle (referred to as Original Equipment Manufacturer or "OEM" solutions), (2) specialized devices which are installed as secondary equipment (referred to as after-market solutions) and (3) mobile phone solutions.

OEM class devices are able to take advantage of the many internal vehicle signals (such as brake pedal position) in order to warn the driver more intelligently. These devices can also integrate with other vehicle systems such as infotainment units and vehicle control systems. However these devices are specialized and extremely complex systems, and consequently they add significant additional cost to the vehicle.

"After-market" class driver monitoring devices are self-contained units that contain processing and sensing apparatus. These are typically installed into a truck or car using a mechanical mount onto the dashboard or windscreen of the vehicle. The devices are more expensive than OEM solutions due to the additional mechanical packaging and often require a subscription to a service for storing and processing the captured performance data.

The third class of monitoring device (3) is a smart phone running application software that utilizes the camera(s), GPS, accelerometer and network connectivity of the phone hardware in order to analyse the driving scene. The utility of phone-based solutions have typically been limited by the general-purpose nature and variable sensing and processing hardware that occur across the many types of phones, making it difficult for the phone-based approach to produce reliable or useful warnings.

However one key aspect of the driving safety problem that is not addressed by devices in class (1) or (2) is the widespread problem of phone use while driving. Mobile phones are extremely hazardous to operate when driving due to the distracting nature of their often complex user interfaces. In many parts of the world it is now illegal to touch or operate a phone while driving but this is very difficult to enforce and studies show that these laws have nearly no effect on the behaviour of many drivers, in particular the young driver demographic. In this regard, the phone-based solution has an advantage because the phone application software can change the interface of the phone in order to remove any need for the driver to interact with the phone.

Driving monitoring software that operates on phones typically uses the built-in GPS to determine where the vehicle is located and the speed of the vehicle. In addition, the built-in accelerometer in the phone can sense "shock" events such as sudden breaking or hard cornering behaviour. In addition, the forward facing primary camera of the phone is used to track information in the driving scene.

However, with regards to sensing the driver's attention, the camera on the phone that faces the user is unsuitable for this task. To measure driver attention requires continuous tracking of their head-pose, face and eye features (including their eye-opening and gaze-direction). Cameras used in modern phones have insufficient resolution and low sensitivity to infra-red wavelengths of light to accomplish these measurements reliably. In particular, gaze-tracking methods often rely on locating a known reflection from the cornea of the eye; imaging this reflection in sunlit conditions requires a narrow-band infrared filter over the lens combined with bright infra-red illuminators at the band-pass wavelength, which is hardware that does not exist in any phone.

The problem exists that there are no phones with hardware suitable to perform reliable driver attention monitoring in sunlight. This is due to the practical economic limitations of what can be achieved with phone hardware, including the significant cost of incorporating a gaze-tracking capable front camera and the number of LEDs that are required to illuminate the eye at suitable power levels, the physical size of this additional hardware, the processing power and heat that associated with the illumination and video analysis software.

SUMMARY OF THE INVENTION

In accordance with a first aspect of the present invention there is provided a mount for supporting a mobile device having a wireless transceiver within a vehicle having a driver, the mount including:

a body having a supporting formation adapted to releasably support the mobile device in a supported operative position within the vehicle; and an electrical interface for connecting to an external power source, the interface being positioned to engage a complementary electrical port of the mobile device when the mobile device is in the operative position to supply power to the mobile device;

wherein the mount and the mobile device collectively define an illumination device and a first camera that cooperate to obtain predetermined performance information about the driver.

The illumination device is preferably disposed on the body. The first camera device is preferably also disposed on the body.

The mobile device preferably includes a second camera which, in the operative position, is oriented to capture a road scene in front of the vehicle. In the operative position, the mobile device preferably facilitates the selective actuation of the camera and the illumination device.

The illumination device preferably includes a light emitting diode. More preferably the illumination device includes two light emitting diodes. The first camera is preferably disposed intermediate the light emitting diodes.

The first camera and the light emitting diodes are preferably disposed on an upper portion of the body such that they are unobscured by the mobile device in its operative position.

In one embodiment, the mount includes a visible indicator which illuminates when the mobile device is in the operative position.

The supporting formation preferably includes a vertical formation which extends at least partway along a back surface of the mobile device when in its operative position. The vertical formation preferably includes an aperture positioned to allow exposure of the second camera when the mobile device is in the operative position.

In the operative position, the camera and the illumination device are preferably directed towards a driver of the vehicle.

In one embodiment, the body includes a heat sink for dissipating heat from the mobile device when in the operative position.

In one embodiment, the mount includes a proximity sensor to detect a distance of the mobile device from the mount. The proximity sensor preferably includes one or more of a radio frequency device, Bluetooth™ device or ultrasonic localisation device.

In one embodiment, the mount includes a speaker adapted to issue alerts based on predetermined events.

The mount preferably includes a mounting formation attached to the body and adapted to supportively engage the mount with a portion of the vehicle.

The mobile device is preferably a mobile telephone handset.

In one embodiment the mount includes a processor configured to control the illumination device and first camera to capture images of the driver's face and further configured to process the captured images to determine a measure of the driver's alertness or drowsiness.

In one embodiment the mount is releasably mounted to an interior portion of the vehicle. In another embodiment the mount is integrally connected to an interior portion of the vehicle.

In accordance with a second aspect of the present invention there is provided system for obtaining driver performance image data of a driver of a vehicle, the system including:

a mount mounted to the vehicle, the mount including:
  a body having a supporting formation adapted to releasably support a mobile device in a supported operative position within the vehicle;
  a first camera positioned to capture images of the driver during a predetermined period;
  an illumination device positioned to illuminate the driver during the predetermined period;
  an electrical interface connected to an external power source; and
a mobile device including:
  a second camera positioned to capture images of a road scene in front of the vehicle;
  an electrical port electrically connectible with the electrical interface to supply power to the mobile device when the mobile device is in the operative position; and
  a processor configured to selectively actuate the first and second cameras and the illumination device when the mobile device is in the operative position and to obtain driver performance data of the driver from the captured images.

In one embodiment, the performance data includes a driver performance score. In another embodiment, the performance data includes a measure of alertness or drowsiness of the driver. In a further embodiment, the performance data includes a measure of the driver's responsiveness to predetermined events.

In one embodiment, upon detection of a predetermined event, the first and/or second camera is instructed to record a video stream of images for a predetermined period of time. The predetermined event preferably includes an event within the road scene detected from the second camera.

The mobile device preferably includes a microphone and, in one embodiment, the predetermined event includes a verbal instruction from the driver or a passenger of the vehicle received by the microphone.

In one embodiment, the mobile device is in communication with a vehicle speaker and, upon detection of a predetermined event, the vehicle speaker is instructed to issue an audio alert. In one embodiment, the mount includes a sensor to detect a distance of the mobile device from the mount. Preferably, the vehicle speaker is instructed to issue an audio alert when the proximity sensor detects the mobile device to be within a predetermined proximity from the mount and the mobile device is not in the operative position.

In one embodiment, the mount is releasably mounted to an interior portion of the vehicle. In another embodiment, the mount is integrally connected to an interior portion of the vehicle.

The mobile device preferably includes a wireless transceiver configured to communicate selected driver performance data to an external database.

In accordance with a third aspect of the present invention there is provided a mobile device adapted to cooperate with a mount within a vehicle, the mount including a first camera and an illumination device, the mobile device including:

a housing adapted to be releasably supported in a supported operative position within a supporting formation of the mount;

an electrical port adapted to electrically connect with an electrical interface of the mount when in the operative position;

a second camera; and a processor configured to selectively actuate the first and second camera and the illumination device when the mobile device is in the operative position.

When the mobile device is in the operative position, the processor is preferably configured to perform one or more additional functions relating to the driver or vehicle operation. One additional function is the obtaining of performance data of the driver from the captured images when the mobile device is in the operative position.

The mobile device preferably includes a GPS location device and, in one embodiment, an additional function is to access position data from the GPS location device to obtain position and/or velocity data of the vehicle. In one embodiment, the processor is configured to issue an alert when the velocity of the vehicle is detected to exceed a predetermined value.

The mobile device preferably includes an accelerometer and, in one embodiment, an additional function is to access acceleration data from the accelerometer to obtain vehicle acceleration data. In one embodiment, the processor is configured to issue an alert when the acceleration of the vehicle is detected to exceed a predetermined value. The alert is preferably issued through an interface of the mobile device to the driver.

The mobile device preferably includes a wireless transceiver and, in one embodiment, an additional function is to transmit one or more of captured images, acceleration, position and velocity data, and alerts to an external server through the wireless transceiver. In one embodiment, the wireless transceiver is able to communicate with an onboard computer of the vehicle when the mobile device is in the operative position.

In one embodiment, an additional function is to process images of the driver captured by the first camera and perform a biometric face recognition algorithm to identify the driver.

The device is preferably a mobile telephone handset.

One additional function is the prevention of incoming calls and/or text messages. Another additional function is to send an alert to a caller who has attempted to call the mobile telephone handset when it is in the operative position.

In accordance with a fourth aspect of the present invention there is provided a system for obtaining driver performance image data of a driver of a vehicle, the system including:

a mount mounted to the vehicle, the mount including:
 a body having a supporting formation adapted to releasably support a mobile device in a supported operative position within the vehicle;
 a first camera positioned to capture images of the driver during a predetermined period;
 an illumination device positioned to illuminate the driver during the predetermined period;
 an electrical interface connected to an external power source; and
 a processor; and
a mobile device including:
 a second camera positioned to capture images of a road scene in front of the vehicle;
 an electrical port electrically connectible with the electrical interface to supply power to the mobile device when the mobile device is in the operative position; and
wherein the processor is configured to selectively actuate the first and second cameras and the illumination device when the mobile device is in the operative position and to obtain driver performance data of the driver from the captured images.

BRIEF DESCRIPTION OF THE DRAWINGS

Preferred embodiments of the disclosure will now be described, by way of example only, with reference to the accompanying drawings in which.

DETAILED DESCRIPTION

Overview

Figure 1:
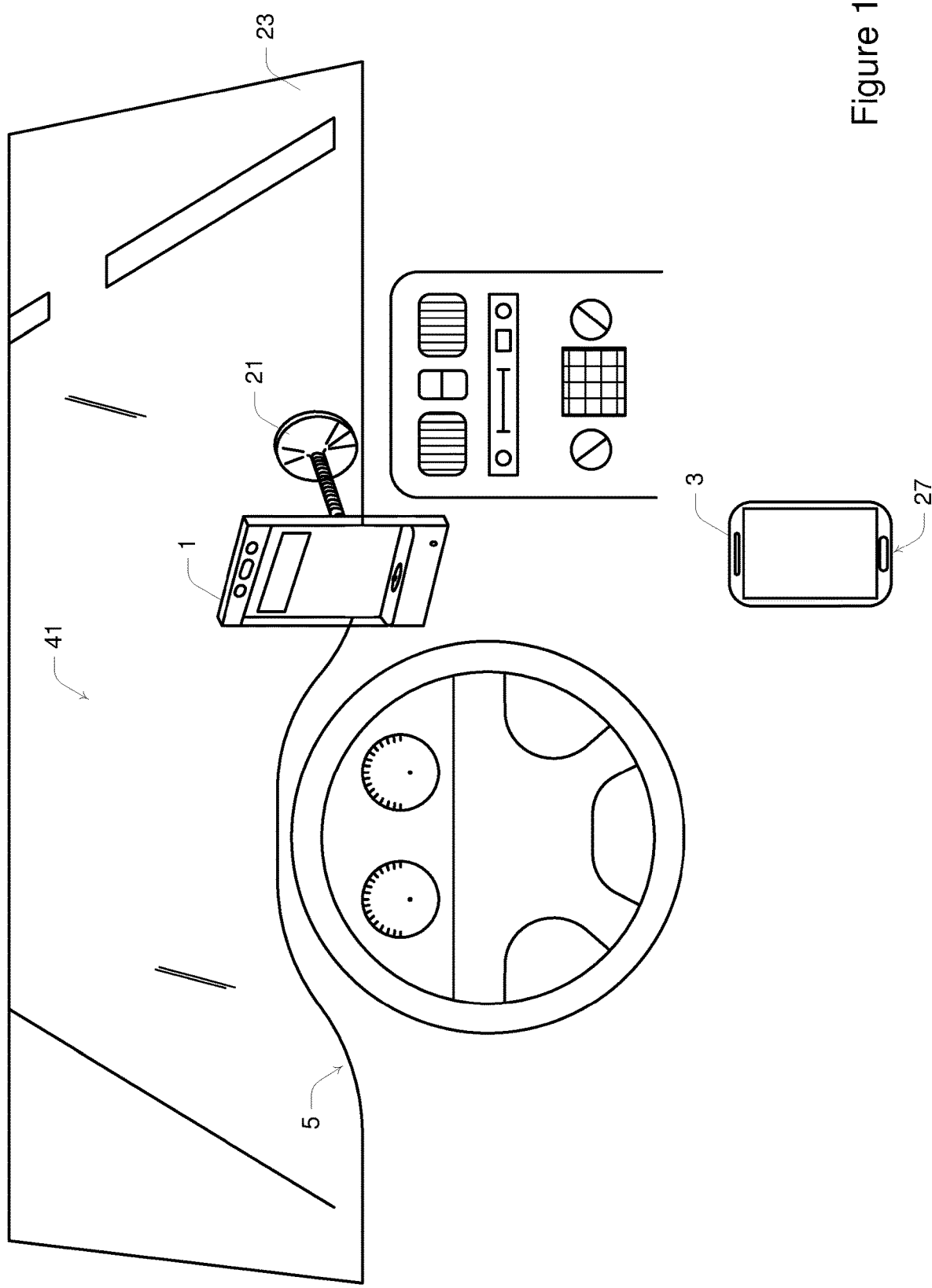
FIG. 1 is a driver perspective view of a vehicle dash and windshield illustrating a mounted electronics dock according to an aspect of the present invention.

Referring initially to FIG. 1, the embodiments of the present invention are adapted to provide a mount in the form of an electronics dock 1 for supporting a mobile device such as a mobile telephone handset 3 having a wireless transceiver. In other embodiments, dock 1 is adapted to support other mobile devices such as tablet computers. Dock 1 is adapted to be supported within a vehicle 5 having a driver (not shown). Embodiments described herein are adapted to facilitate the gathering of data for monitoring and assessing the performance of the driver. However, it will be appreciated that the invention is also applicable to other applications. Further, although the vehicle is illustrated as being a car, it will be appreciated that the invention is applicable to other vehicles including, trucks, motorcycles and heavy machinery.

Figure 2:
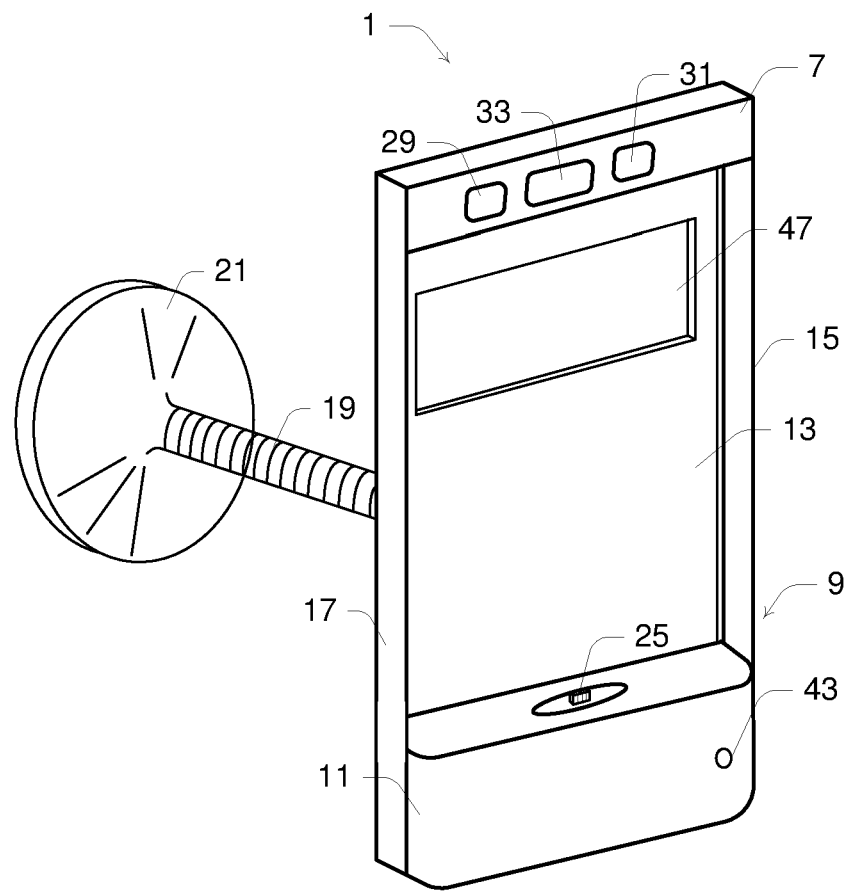
FIG. 2 is a perspective view of the electronics dock illustrated in FIG. 1.

As best shown in FIG. 2, dock 1 includes a substantially rectangular body 7 formed of rigid or semi-rigid material such as a plastics material. As mentioned below, body 7 may include materials suitable for acting as a heat sink. Body 7 includes a supporting formation 9 adapted to releasably support handset 3 within vehicle 5 in the supported operative position illustrated in FIG. 2. Supporting formation includes a base 11 and a vertical formation 13 which extends primarily vertically when dock 1 is mounted to vehicle 5 and contoured closely along a back surface 14 of handset 3 when it is positioned in its operative position. Base 11 is recessed within vertical formation 13 such that side regions 15 and 17 of vertical formation 13 extend around handset 1 when in the operative position.

Dock 1 includes a mounting formation in the form of suction cup 19 and flexible support arm 21 attached to body 7. Suction cup 19 is adapted to releasably engage with a windshield 23 of vehicle 5 to supportively engage dock 1 within vehicle 3 as shown in FIG. 1. It will, however, be appreciated that other suitable types of mounting formations are able to be implemented to maintain dock 1 within vehicle 5 at other suitable locations.

Figure 3:
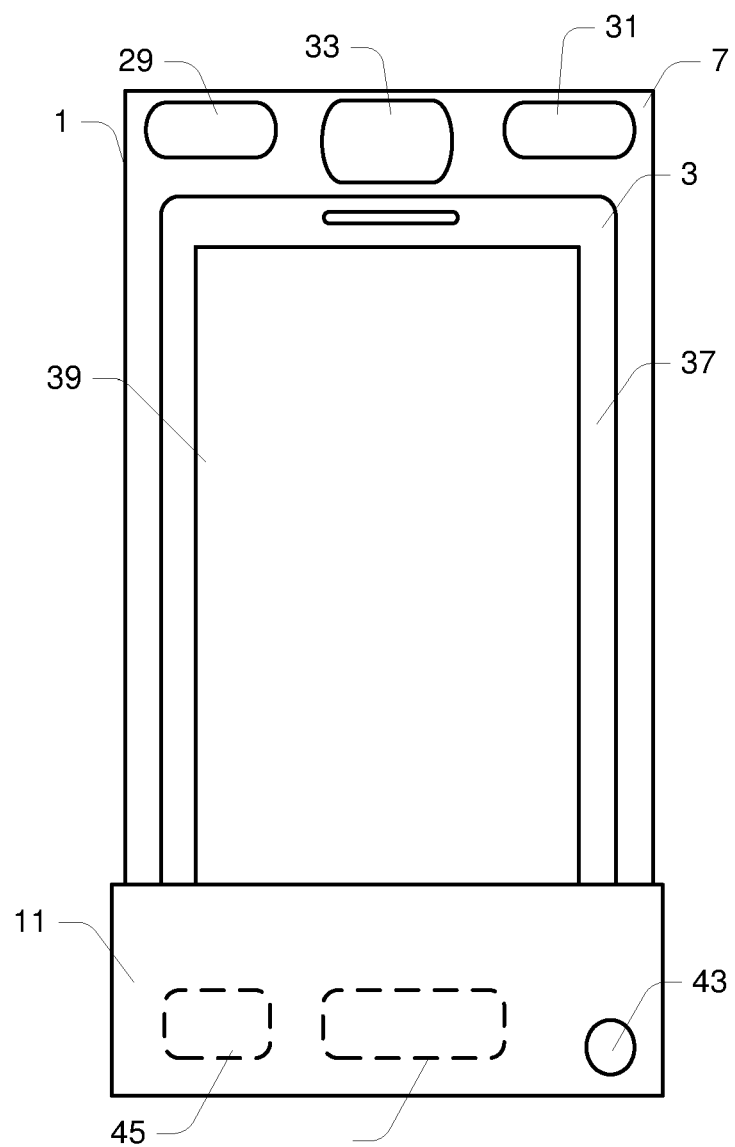
FIG. 3 is a front view of a mobile telephone handset situated in a supported position of the electronics dock illustrated in FIG. 1.

Referring generally to FIGS. 1 to 3, dock 1 includes an electrical interface in the form of electrical connector 25 for connecting to handset 3. Connector 25 is positioned to engage a complementary electrical port 27 of handset 3 when handset 3 is in the operative position to supply power to handset 3. Connector 25 is adapted to receive modular converters for mounting handsets having different electrical ports that are incompatible with connector 25. In some embodiments, connector 25 is in the form of a USB interface having at least two data pins and at least two power supply pins for facilitating data transfer between dock 1 and handset 3 by a USB standard protocol such as USB, USB 2.0 or USB 3.0. Suitable data compression may be applied to facilitate faster data transmission through connector 25.

It will be appreciated that handset 3 and dock 1 are able to communicate wirelessly without the need of a wired connection through connector 25 and port 27. However, physical connection through connector 25 and port 27 provide for charging handset 3 and also ensuring handset 3 is positioned in a suitable position/orientation for operation.

Dock 1 also includes an illumination device in the form of two horizontally spatially disposed light emitting diodes (LEDs) 29 and 31 disposed on an upper region of body 7. Dock 1 further includes a driver facing camera 33 that is disposed on an upper region of body 7 intermediate LEDs 29 and 31. This positioning ensures that camera 33 and LEDs 29 and 31 are unobscured by handset 3 when handset 3 is in the operative position. In particular, when handset 3 is in the operative position, camera 33 is positioned to capture images of the driver's face and LEDs 29 and 31 are positioned to illuminate the driver's face during image capture. LEDs 29 and 31 preferably emit light in the infrared wavelength range to reduce driver distraction. Further, camera 33 is adapted to efficiently detect the infrared light.

Two LEDs are preferably spaced apart by a distance in the range of 2 cm to 10 cm to define an angular difference which provides for performing advanced glare reduction and glint detection image processing techniques so as to better capture the driver's face during various lighting conditions. To perform these techniques, sequential images are captured by camera 33 during illumination of different LEDs and image processing is performed on the different images to reduce or remove lighting effects and more clearly identify facial features. In one embodiment, only a single LED is utilised. In a further embodiment, more than two LEDs are utilised. In some other embodiments, more than one driver facing camera is utilised. In some embodiments, a driver facing camera located on handset 3 is utilised instead of or in conjunction with camera 33.

Driver-facing camera 33 may take various forms including a conventional 2D digital camera including a two-dimensional array of image sensors or a time-of-flight camera providing depth information. Depth information is important for improving accuracy and reliability of some measurements. In other embodiments (not illustrated), dock 1 includes multiple cameras such as an arrangement of two conventional 2D digital cameras which are driven to provide stereoscopic imaging of the driver from which depth information can be derived. In one embodiment, dock 1 includes both a conventional 2D camera and a time-of-flight camera.

Figure 4:
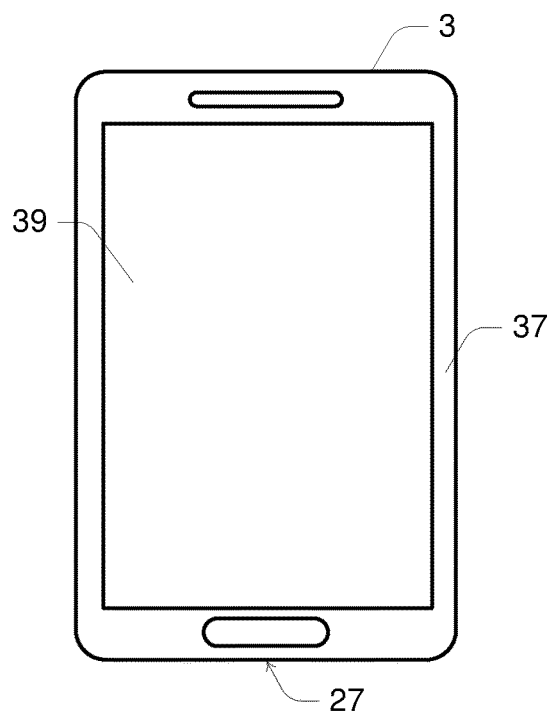
FIG. 4 is a front view of a mobile telephone handset.
Figure 5:
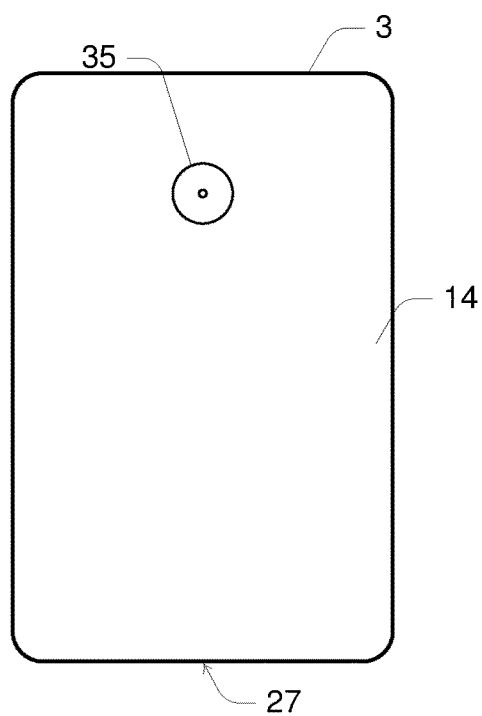
FIG. 5 is a back view of the mobile telephone handset of FIG. 4.

Referring to FIGS. 4 and 5, as is typical with many current mobile telephone handsets, handset 3 includes a forward facing camera 35 on back surface 14 opposite a front surface 37 having a substantially rectangular touch display screen 39. In the operative position, camera 35 is oriented to capture a road scene 41 in front of vehicle 5, as illustrated best in FIG. 1. When handset 3 is in the operative position, dock 1 and handset 3 collectively facilitate the selective actuation of cameras 33 and 35, and LEDs 29 and 31.

More generally, however, the invention provides an electronics dock which can integrate with a mobile handset to form a system which collectively defines an illumination device and at least a driver facing camera that cooperate to obtain predetermined performance information about the driver. In particular, it will be appreciated that driver facing camera 33 is required as typical user facing cameras on mobile telephone devices lack sufficient resolution to perform accurate facial feature image processing techniques, especially when tracking a driver of a vehicle from a dash. However, it will also be appreciated that, as technology advances, user facing cameras having sufficient resolution to perform facial feature image processing techniques will be incorporated into mobile telephone handsets. The present invention is well adapted to manage this situation by controlling the user facing phone camera to capture images of the driver's face rather than relying on driver facing camera 33. These advanced handsets may also include suitable facial illumination technology. Thus in some embodiments of the invention, where camera 33 and LEDs 29 and 31 are incorporated into handset 3, dock 1 does not include these features.

Dock 1 also includes a visible indicator in the form of an indicator LED 43 which illuminates when handset 3 is in the operative position. Other LEDs may be incorporated on dock 1 to indicate various other actions and functions. In some embodiments, body 7 includes or is formed of a passive heat sink material for dissipating heat from the mobile device when in the operative position. Mobile phone manufacturers typically limit the processing power of handsets to conserve heat dissipation with the exception of specific functions such as video capture and processing. Employing a suitable heat sink allows handset 3 to be operated in a more processor intensive mode for longer periods or indefinitely while in the operative position.

Dock 1 further includes a wireless sensor 45 which is able to communicate with handset 3 when handset 3 is not in the supported position. In addition to communicate wirelessly with handset 3, sensor 45 is able to detect a distance of handset 3 from dock 1. Suitable sensor technology includes one or more of a radio frequency device, Bluetooth™ device or ultrasonic localisation device which are able to communicate wirelessly with handset 3. In some embodiments, detection of handset 3 within a predetermined proximity from dock 1 while handset 3 is not in the supported position prompts an alert to the driver as accurate driver monitoring functionality is likely to be restricted until handset 3 is in the operative position in dock 1. For example, the vehicle speaker is instructed to issue an audio alert based on the proximal detection of handset 3 from dock 1.

In use, dock 1 is positioned to ensure the forward facing camera 35 is able to clearly capture images of road scene 41. To achieve this, vertical formation 13 includes a substantially rectangular aperture 47 positioned to allow exposure of camera 35 when the mobile device is in the supported position. In various other embodiments, aperture 47 is shaped and positioned appropriately to reveal cameras on a variety of different handset models.

It will be appreciated that the illustrated embodiment is exemplary only and that dock 1 is able to be implemented in a variety of different mechanical arrangements which still permit the functional operation of the present invention. For example, LEDs 29 and 31 and camera 33 are, in some embodiments, positioned on base 11 or side regions 15 and 17, and vertical formation 13 only extends partway along the back surface of handset 3. In other embodiments, dock 1 is integral with the dash or another region of the vehicle and included during the vehicle manufacture. In these embodiments where the dock is integral with the vehicle, dock 1 may be formed from an extrusion process in a vehicle component or may be fixedly mounted to a vehicle component during vehicle manufacture by a fixed mounting which may include flexible support arm 21 for adjusting the position of dock 1. In general, it is intended that the present invention is capable of operating with substantially any mechanical design provided that handset 3 is supportively maintained within dock 1 inside the vehicle such that images of at least the driver's face and preferably both the driver's face and a road scene can be accurately captured.

Figure 6:
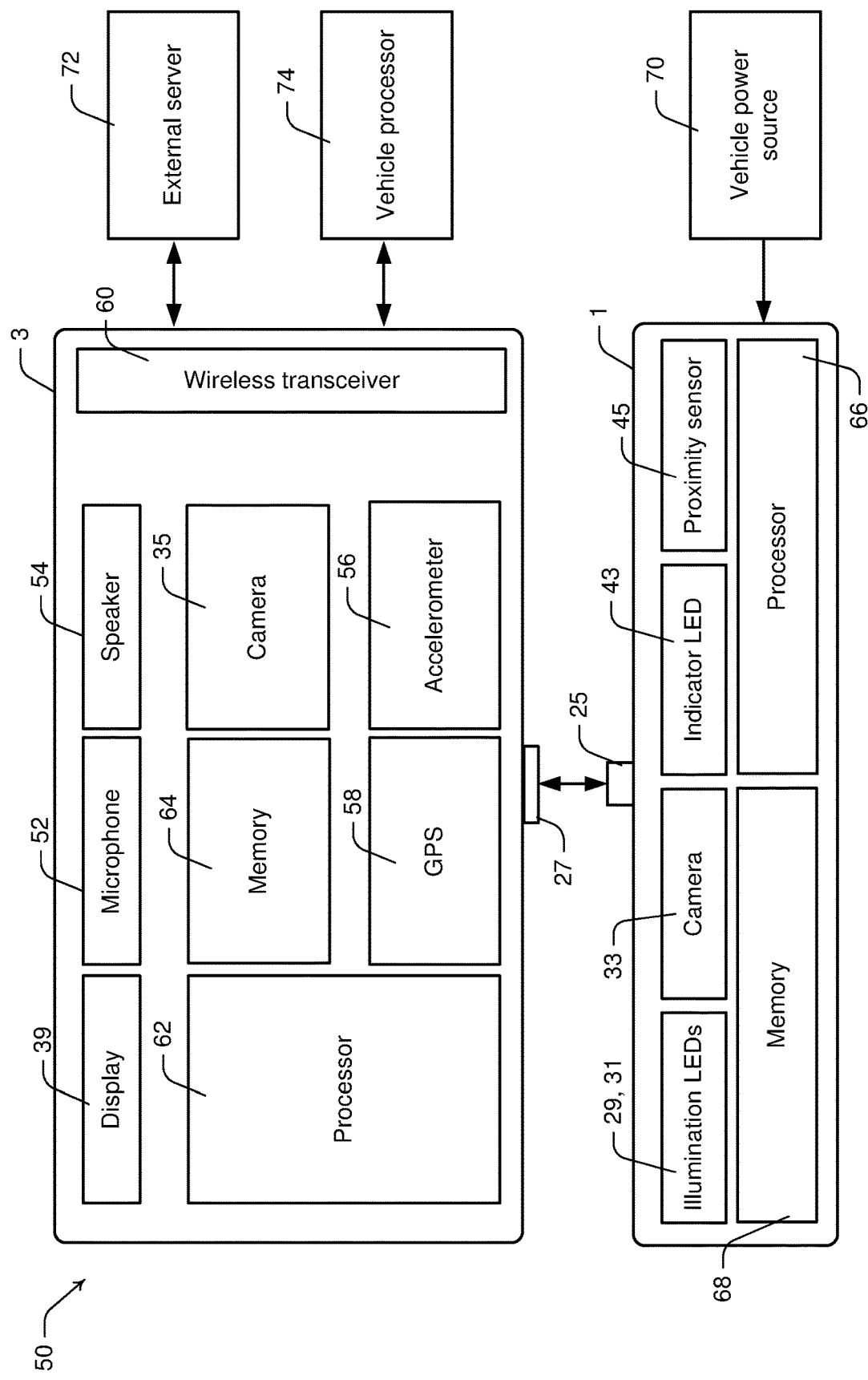
FIG. 6 is a schematic illustration of a system for obtaining driver performance and vehicle monitoring data using a mobile telephone handset and an electronics dock.

To control the various elements described above, internally, the system leverages the embedded microprocessor of handset 3 and optionally a processor and memory within dock 1. FIG. 6 schematically illustrates the functional elements of handset 3 and dock 1, to illustrate how these devices together define a system 50 for obtaining driver performance data and performing various other safety-related functions.

System 50 includes dock 1, as described above, which is releasably or fixedly mounted to the vehicle. Handset 3 includes hardware and software indicative of the current or future standards of Smartphones. This includes at least display screen 39, microphone 52, speaker 54, accelerometer 56, GPS device 58, wireless transceiver 60, processor 62 and memory 64, as well as camera 35. Processor 62 may be in the form of a microprocessor, or microprocessor in conjunction with custom or specialized circuitry, executing code stored in memory 64. Memory 64 may include random access memory (RAM), read-only memory (ROM), electrically erasable programmable read-only memory (EEPROM), and other equivalent memory or storage systems as should be readily apparent to those skilled in the art. Suitable handsets include the various models of iPhone™ manufactured by Apple, Inc or the various models of Galaxy™ manufactured by Samsung Electronics Co., Ltd.

Dock 1 also includes a processor 66 and associated memory 68. As with handset 3, processor 66 may be in the form of a microprocessor, or microprocessor in conjunction with custom or specialized circuitry, executing code stored in memory 68. Memory 68 may include random access memory (RAM), read-only memory (ROM), electrically erasable programmable read-only memory (EEPROM), and other equivalent memory or storage systems as should be readily apparent to those skilled in the art. Although not illustrated, handset 3 and/or dock 1 include frame grabbers or image storage circuitry associated with their respective processors for receiving and storing the successive captured images.

The electronic components of dock 1 are preferably of the embedded system format to provide a video pipeline for images captured by camera 33. Memory 68 is preferably reserved for image buffering operations and local storage of image processing algorithms. The vast majority of ongoing captured images and driver performance/monitoring data are reserved for storage on handset memory 64, which can be leveraged by dock 1 when necessary.

Dock 1 is connectable to a vehicle power source 70, such as the vehicle battery, through a power cable connectable to a power connector (not shown) such as a USB connector.

In operation, control of LEDs 29, 31, cameras 33 and 35, and the various other components is performed by dock processor 66 and/or handset processor 68. In some embodiments, both processors are run in parallel to provide enhanced processing power. In one embodiment, choice of which processor to use is determined by the current processing load. During periods of high computational intensity, control of camera 33 and LEDs 29, 31 is preferably provided locally by processor 66. Illumination of LEDs 29, 31 is synchronised with the exposure time or integration time of the sensors within camera 33. In embodiments where dock 1 includes multiple cameras or leverages a driver facing camera from handset 3, illumination from the LEDs is shared between the two cameras in an alternating or sequenced time interleaved fashion.

To perform various functions described below, handset 3 is first pre-loaded with a third party software application (app) that is configured to integrate with dock 1 to control the various components. The app is downloadable from well-known sources such as the Apple™ app store or the Google Play™ store. Once installed, the app integrates with the handset's camera 35, display 39, GPS device 58, accelerometer 56, microphone 52 and speaker 54. The app also integrates to the handset's hardware layer to activate certain functions upon detection of connection to dock 1 through port 27. Interaction with the app occurs in the usual way through the touchscreen display 39 of handset 3.

During or after mounting dock 1 within the vehicle, an initialisation procedure is performed to ensure the cameras are properly aligned. This initialisation procedure is accessed in a menu of the app. In one embodiment, the initialisation procedure includes detecting the driver's face and providing auditory instructions through speaker 54 or a vehicle speaker to adjust the position and/or orientation of dock 1. During initialisation, video feeds from cameras 33 and 35 are displayed on display 39 in a split screen arrangement to allow the driver to see the current field of view of each camera. In the correct position, camera 33 should have its field of view centred on the driver's face and camera 35 should have its field of view centred on the forward road scene. The initialisation procedure may include one or more calibration procedures including recognising the driver (by facial recognition and/or handset identification) and loading pre-stored driver information.

Upon installation of the app, various image processing algorithms are stored in memory 64 of handset for performing, for example, face, head and eye gaze tracking, facial recognition and eye closure detection. Upon integration with dock 1 some of these algorithms may be copied to local memory 68 of dock 1 to be accessed by local processor 66 during operation.

Driver Performance and Monitoring

The present invention also provides a system for obtaining driver performance and vehicle monitoring data. A primary benefit over existing systems is that no dedicated dash-mounted monitoring device is required and the primary cost and functionality is provided by a mobile telephone handset.

With handset 3 positioned in the operative position, camera 33 is positioned to capture images of the driver during a predetermined period. During this period, LEDs 29 and 31 are positioned to illuminate the driver as described above.

Handset 3 contributes to the system by providing camera 35 positioned to capture images of road scene 41 in front of the vehicle when handset 3 is in the supported position. Importantly, handset 3 includes processor 62 which can be leveraged to provide additional processing power for system 50 over and above processor 66. Processor 66 (and/or processor 62) is configured to selectively actuate cameras 33 and 35 and LEDs 29 and 31 when handset 3 is in the supported position and to obtain driver performance data of the driver from the captured images. Performance data includes, inter alia, data indicative of a driver's alertness or drowsiness and/or vehicle speed relative to local legal speed limits. Processor 66 is adapted to detect when handset 3 is connected to dock 1 and, in response, activate a 'driver monitoring' operating mode including initiating the above-mentioned software app. In addition to controlling cameras 33 and 35 and LEDs 29 and 31, the app instructs processors 66 and 62 to perform a number of additional functions to obtain data for driver or vehicle performance monitoring, as will be described below. In some embodiments, the app presents a simple, more user friendly and safer interface for controlling handset 3 when driving the vehicle.

In operation, camera 35 monitors road scene 41 by capturing image data in the form of images or video sequences of the scene at predetermined times. In conjunction with the monitoring of the road scene, camera 33 monitors the driver by capturing images or video sequences of the driver's face during illumination by LEDs 29 and 31. The image data collected by cameras 33 and 35 are stored in memory 64. To manage memory capacity, in some embodiments, only a certain amount of image data is captured based on a time basis. For example, in one embodiment five minutes of video data is stored in memory 64 and these data are erased unless a particular event of interest is detected during this period. The detection of events triggers system 50 to perform one or more of the following functions:

Capture of image data by cameras 33 and 35.
Varying the capture mode of image data. For example, increasing the camera resolution or video frame rate for a predetermined time period.
Issuing an alert or notification to the driver or an external party.
Transmission or streaming of captured image data to an external server 72 via transceiver 60.

The captured image data is processed by processor 66 to extract information about the scene and driver. The forward facing camera 35 captures activity in front of the vehicle and useful information to extract from the captured images includes the position of the vehicle relative to the road lane markings (lane tracking), and the distance and speed of other vehicles in close proximity to the vehicle. Driver facing camera 33 allows for the identification and extraction of facial features of the driver during driving and the tracking of the driver's head, face or eye gaze direction. If appropriate processing of the driver's face is not possible, processor 66 is configured to issue an alert to the driver to adjust the orientation or position of dock 1 or handset 3. The alert can be issued either visually through display 39 or audibly through speaker 54.

Processing of the images of the driver's face and the road scene allows:

Monitoring of driver fatigue through detection of prolonged or frequent eye closure.
Measurement of head rotation to detect driver distraction and fatigue when the driver's eyes stray off the road for more than a threshold period or frequency.
Identification of the driver through biometric facial recognition.
Tracking of lane position.
Feature activation with eyes.
Identification of nearby dangerous objects in the road scene.
Determination of the driver's overall alertness.

In particular, system 50 is able to perform any of the driver drowsiness or distraction monitoring procedures described in U.S. Pat. No. 7,043,056 to Edwards et al. entitled "Facial Image Processing System" and assigned to Seeing Machines Pty Ltd, the contents of which are incorporated herein by way of cross-reference. However, by incorporating handset 3, access is provided to the driver's past data (upon appropriate permission) such as recent exercise tracked by an exercise app and recent sleep patterns monitored by a sleep tracking app. This additional level of detail can be incorporated into the various monitoring algorithms to provide more accurate driver alertness monitoring.

In any of the above cases, an alert may be issued visually to the driver through the display 39 and/or audibly through speaker 54. Alternatively or in addition, handset 3 may be in communication with a vehicle speaker through Bluetooth™ or other communication with an onboard vehicle processor 74 and, upon detection of a predetermined event, the vehicle speaker is instructed to issue an audio alert.

Advantageously, handset 3 includes other hardware which is able to contribute to providing driver performance monitoring when in the driver monitoring operating mode. As mentioned above, cameras 33 and 35 can be controlled to record image data for a predetermined period of time upon detection of a predetermined event. The driver and/or other parties can also be alerted to the occurrence of an event.

One such event includes the detection of the vehicle drifting off the road (as detected by the lane markings) or another vehicle detected to be within a predetermined 'unsafe' proximity to the vehicle. Further, the driver or a passenger of the vehicle is able to issue a verbal instruction that is received by microphone 52. This verbal instruction represents a predefined event and processor 66 responds by commencing recording of image data or transmitting the image data to external server 72 through transceiver 60. For example, the driver may verbally issue an instruction to record image data if a driver of another vehicle in the road scene performs dangerous or erratic driving behaviour or if a crash has occurred.

When handset 3 is in the operative position, GPS device 58 is instructed to access position data from a GPS service to obtain position and/or velocity data of the vehicle. If GPS device 58 detects the vehicle to be exceeding a predetermined velocity, processor 62 is configured to issue an alert to the driver.

Furthermore, alerts may be issued based on acceleration data obtained from accelerometer 56. For example, if the acceleration of the vehicle is detected to exceed a predetermined value, an alert may be issued. An example event is when the vehicle is stopped abruptly during a collision. In response to a detected event or otherwise, wireless transceiver 60 is configured to transmit the captured image data, acceleration, position and velocity data, and alerts to external server 72.

The various data gathered by system 50 is used to derive performance data for the driver. Example data includes driving smoothness, hard braking events, rapid acceleration, sharp cornering and other characteristics detected by accelerometer 56. In some embodiments, this is in the form of a driver performance score or performance report, which may be transmitted to a third party such as an insurance company. An example performance report for an insurance company may include the location, time, driver alertness and nature of accident or speeding event in which the driver was involved, as well as image data during the event.

The derived performance data allows location and distance metrics such as a list and map of the location of the vehicle during a trip and any destinations where the vehicle stopped. The geo-location may be recorded relative to a predefined geo-fencing system.

Safety Notifications and Parental/User Configuration

In addition to monitoring the driver and measuring the driver's performance, system 50 is able to provide emergency alerts to a third party upon the occurrence of a vehicle incident. For example, accelerometer 56 is able to detect a collision, impact or roll-over of the vehicle from a change in acceleration. Further, the detection of handset 3 not moving or being removed from dock 1 by the driver following detection of the above may be an indication that the incident is serious. In cases such as this, system 50 is adapted to control handset 3 to perform one or more of the following functions:

- Send an emergency message or a call to a pre-stored contact person or guardian indicating the location of the incident;
- Call emergency services (E.g. 119, 911, 000 etc.) and/or send a map position of the incident;
- Activate the speakerphone function so that the driver or a passenger can talk hands free; or
- Alert an insurance company affiliated with the driver.

The present invention also provides a number of preventative safety features to reduce the risk of vehicle accidents. For example, in some embodiments, system 50 detects incoming calls and/or text messages to handset 3 and prevents, blocks or diverts them when handset 3 is in the operative position. In one embodiment, an alert is sent to the person who has attempted to call or message the mobile telephone handset when it is in the supported position. This alert can be a custom voice or text message advising the caller that the recipient is currently driving a vehicle. System 50 is also able to read a received text message and automatically play a voice message through speaker 54 or a vehicle speaker.

Similarly, through the software application the present invention is able to take various actions in response to detecting a dangerous or increasing level of drowsiness of the driver, including:

- Activate sounds or music on handset 3 or through the vehicle's audio system to stimulate the driver;
- Call a contact stored in handset 3;
- Send a text message to a contact stored in handset 3 to alert the contact of the driver's drowsiness;
- Advise the driver (visually or audibly) of the location of a nearby rest area;
- Make a post to an affiliated social media service to alert friends or contacts of the driver's drowsiness; or
- Access a telematics safety service which calls the driver as an alert.

Further, system 50 allows for parental or user control to access a handset's software configuration to:

- Set speed limits or geo-location restrictions of a handset.
- Record and set custom voice and text messages for responding to callers when handset 3 is in the supported position.
- Set user profiles, emergency contacts, user permissions of a handset.
- Add and remove handsets from a list of allowable handsets to be used in a particular vehicle.
- Warn a parent or guardian if handset 3 is moving in the vehicle and not in dock 1.

In some embodiments, as a safety control, the intensity of LEDs 29, 31 is controlled based on a detected distance of the driver's face (or other body part) from the LEDs. This distance is derived from depth information (such as using a time-of-flight camera) or by utilising a proximity sensor located proximate to one of the LEDs.

CONCLUSIONS

It will be appreciated that the present invention provides a system for obtaining driver performance data of a driver of a vehicle.

The invention allows for the simple establishment of a driver performance and monitoring system by utilising the hardware and software of a mobile phone integrated with a handset dock that is mountable within a vehicle. Substantial cost is saved by leveraging from the inbuilt hardware and software functionality of a smartphone type mobile phone or similar mobile computing device. The system provides the functionality of typical dash-mounted cameras or "dash cams" combined with driver performance and fatigue/distraction monitoring.

As mobile phones are generally connected to a mobile telecommunications network, captured driver performance and monitoring data can be transmitted through this network to remote devices/servers and no additional subscription service is required as with conventional dash cams.

The electronics dock of the present invention is able to be bundled with new mobile phone devices and sold together as a retail package or sold separately as a retail phone accessory. Alternatively, the dock may be sold in bulk to insurance companies, who supply the devices to their customers as part of a car insurance policy. The customers' premiums may then be subsidised or reduced based on the usage of the dock and phone system to monitor driver performance according to set protocols. The phone software required to enter the driver monitoring operating mode is able to be inbuilt by device manufacturers or installed later as a modular software update.

The data obtained from the invention is able to be uploaded to a cloud-based server or other online service and sold to interested parties such as government research bodies, insurers and parties of the automotive safety sector.

The invention also provides real-time or near real-time intervention for in-vehicle safety as well as rapid transmission of data via the combination of phone, dock and cloud-based infrastructure.

Interpretation

Unless specifically stated otherwise, as apparent from the following discussions, it is appreciated that throughout the specification discussions utilizing terms such as "processing," "computing," "calculating," "determining", analysing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while diagrams only show a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Reference throughout this specification to "one embodiment", "some embodiments" or "an embodiment" means that a particular feature, structure or characteristic described in connection with the embodiment is included in at least one embodiment of the present disclosure. Thus, appearances of the phrases "in one embodiment", "in some embodiments" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of exemplary embodiments of the disclosure, various features of the disclosure are sometimes grouped together in a single embodiment, Fig., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, electrical or optical contact, or that two or more elements are not in direct contact with each other but yet still co-operate or interact with each other.

Thus, while there has been described what are believed to be the preferred embodiments of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

We claim:

1. A mount configured to support a mobile device within a vehicle having a driver, the mobile device having a wireless transceiver, the mount comprising:
   a body having a supporting formation configured to releasably support the mobile device in a supported operative position within the vehicle, wherein the supported operative position is fixed relative to the vehicle;
   a first camera device that is part of the body of the mount and positioned to capture images of the driver's face, the first camera configured to be controlled by a processor to perform facial image processing to identify and extract facial features of the driver while driving, and the first camera configured to track a driver's head, face, or eye gaze direction;
   an illumination device positioned to illuminate the driver's face during image capture; and
   an electrical interface configured to be connected to an external power source, the electrical interface being positioned to engage a complementary electrical port of the mobile device, when the mobile device is in the operative position, and to supply power from the external power source to the mobile device;

wherein the mount is configured to cooperate with the mobile device to collectively define an illumination and imaging system that is configured to determine performance information about the driver.

2. The mount according to claim 1, wherein the mount is configured to orient the mobile device such that a second camera of the mobile device is oriented to capture a road scene in front of the vehicle.

3. The mount according to claim 2, wherein the supporting formation includes a vertical formation that is configured to extend at least partway along a back surface of the mobile device when the mobile device is in the operative position, and wherein the vertical formation includes an aperture positioned to allow exposure of the second camera when the mobile device is in the operative position.

4. The mount according to claim 2, further comprising a mount processor configured to control the illumination device and first camera to capture images of the driver's face and further configured to process the captured images to determine a measure of the driver's alertness or drowsiness.

5. The mount according to claim 4, wherein upon detection of a predetermined event, mount process is configured to instruct the first and/or second camera to record a video stream of images for a predetermined period of time.

6. The mount according to claim 5, wherein the predetermined event includes an event within the road scene detected by the mount processor based on an image captured by the second camera.

7. The mount according to claim 4, wherein the mount processor is configured to instruct the wireless transceiver to communicate selected driver performance data to an external database.

8. The mount according to claim 1, wherein, when the mobile device is in the operative position, the first camera and the illumination device are configured to be selectively actuated by the mobile device.

9. The mount according to claim 1, wherein, in the operative position, the first camera and the illumination device are directed towards a driver of the vehicle.

10. The mount according to claim 1, wherein the body includes a heat sink configured to dissipate heat from the mobile device when the mobile device is supported by the supporting formation in the operative position.

11. The mount according to claim 1, further comprising a proximity sensor configured to detect a distance of the mobile device from the mount.

12. The mount according to claim 11, wherein the proximity sensor includes one or more of a radio frequency device, Bluetooth™ device or ultrasonic localization device.

13. The mount according to claim 1, further comprising a speaker configured to issue alerts based on predetermined events.

14. The mount according to claim 1, wherein the mount is configured to be integrally connected to an interior portion of the vehicle.

15. The mount according to claim 1, wherein the performance information includes a measure of alertness or drowsiness of the driver and/or a measure of the driver's responsiveness to predetermined events.

16. The mount according to claim 1, wherein the illumination device is configured to illuminate the driver's eyes using an LED illuminator.

17. The mount according to claim 16, wherein the LED illuminator is an infrared LED.

18. The mount according to claim 1, wherein the illumination device is configured to illuminate the driver's eyes at a suitable power level to allow gaze tracking based on images captured by the first camera.

19. The mount according to claim 1, wherein the illumination device is configured to illuminate the driver's eyes at a suitable power level to allow gaze tracking in the presence of sunlight.

20. The mount according to claim 1, wherein the first camera is configured to capture a known reflection from a cornea of the driver's eye.

21. The mount according to claim 20, wherein the first camera is configured to capture a known reflection of infrared light from a cornea of the driver's eye.

22. The mount according to claim 1, wherein the illumination device includes an infrared illuminator.

23. The mount according to claim 22, wherein the first camera includes a narrow-band infrared filter.

24. A mobile device configured to cooperate with a mount within a vehicle, the mount including a first camera and an illumination device, the mobile device comprising:
a housing configured to be releasably supported in a supported operative position within a supporting formation of the mount, wherein the supported operative position is fixed relative to the vehicle;
an electrical port configured to electrically connect with an electrical interface of the mount when in the operative position;
a wireless transceiver;
a second camera; and
a mobile device processor configured to selectively actuate the first and second camera and the illumination device when the mobile device is in the operative position;
wherein the mobile device processor is configured to communicate with the first camera that is part of a body of the mount, the mobile device processor providing instructions to the first camera to control the first camera to perform facial image processing to identify and to extract facial features of the driver during driving, and to instruct the first camera to track a driver's head, face, or eye gaze direction.

25. The mobile device according to claim 24 wherein, when the mobile device is in the operative position, the mobile device processor is configured to perform one or more additional functions relating to the driver or vehicle operation.

26. The mobile device according to claim 25, wherein the additional functions include:
obtaining performance data of the driver based on images captured by the first and/or second cameras when the mobile device is in the operative position;
accessing position data from a GPS location device to obtain position and/or velocity data of the vehicle;
accessing acceleration data from an accelerometer to obtain vehicle acceleration data;
accessing, by the wireless transceiver in communication with an external server, one or more of captured images, acceleration data, position data, and velocity data, and alerts;
processing images of the driver captured by the first camera and performing a biometric face recognition algorithm to identify the driver;
preventing incoming calls and/or text messages to the mobile device; and
sending an alert to a caller who has attempted to call the mobile device when it is in the operative position.

27. The mobile device according to claim 24, wherein the mobile device processor is configured to communicate with the mount to control one or more of the illumination device and the first camera and/or to process captured images to determine a measure of the driver's alertness or drowsiness.

28. The mobile device according to claim 27, wherein the mobile device processor is configured to share the control of the first camera and/or illumination device, with the mount processor, based on a current processing load.

29. The mobile device according to claim 27, wherein the wireless transceiver is configured to transmit one or more of captured images, vehicle acceleration, vehicle position, vehicle velocity data, and alerts to an external server through the wireless transceiver.

30. The mobile device according to claim 29, wherein the wireless transceiver is configured to communicate with the external server, the external server including a third processor that is configured to communicate with one or both of the mount processor and the mobile device processor in a distributed network environment.

* * * * *